(12) United States Patent
Toda et al.

(10) Patent No.: US 7,215,110 B2
(45) Date of Patent: May 8, 2007

(54) SEAL RING, SEALING APPARATUS AND BEARING APPARATUS

(75) Inventors: Kazutoshi Toda, Tomdabaya (JP);
Minoru Sentoku, Kashiba (JP);
Hirokazu Arai, Yamatokoriyama (JP);
Fumiaki Kasahara, Kashiwara (JP);
Shinichi Obayashi, Myouzai-gun (JP)

(73) Assignees: Koyo Seiko Co., Ltd., Osaka-shi (JP);
Koyo Sealing Techno Co., Ltd., Itano-gun (JP)

( * ) Notice: Subject to any disclaimer, the term of this patent is extended or adjusted under 35 U.S.C. 154(b) by 68 days.

(21) Appl. No.: 11/149,841

(22) Filed: Jun. 10, 2005

(65) Prior Publication Data

US 2005/0242514 A1 Nov. 3, 2005

Related U.S. Application Data

(60) Continuation of application No. 10/291,321, filed on Nov. 8, 2002, now abandoned, which is a division of application No. 09/870,953, filed on May 30, 2001, now Pat. No. 6,499,885.

(30) Foreign Application Priority Data

May 31, 2000 (JP) .............................. 2000-162121

Apr. 13, 2001 (JP) .............................. 2001-114902

(51) Int. Cl.
*G01P 3/48* (2006.01)
(52) U.S. Cl. ...................... 324/174; 384/448
(58) Field of Classification Search ................ 324/174, 324/173; 384/448, 446, 544
See application file for complete search history.

(56) References Cited

U.S. PATENT DOCUMENTS 5,195,830 A * 3/1993 Caillault et al. ............. 384/448
2001/0051010 A1* 12/2001 Toda et al. ................... 384/448
2005/0259902 A1* 11/2005 Ohtsuki et al. .............. 384/448

* cited by examiner

*Primary Examiner*—Lenard A. Footland
(74) *Attorney, Agent, or Firm*—Jordan and Hamburg LLP (57) ABSTRACT

A seal ring has an annular body which is constituted so that a disc section extended to a radially inward direction is overlapped with one end of a cylindrical section, and a sensor member for detecting rotation of an inner ring is provided to an outer periphery of the cylindrical section, and an outer case for covering the sensor member is provided by insert-forming. The outer case contracts after it is formed and is press-contact with the cylindrical section so that a gap is hardly generated.

13 Claims, 6 Drawing Sheets

SEAL RING, SEALING APPARATUS AND BEARING APPARATUS

REFERENCE TO RELATED APPLICATIONS

This is a continuation of Ser. No. 10/291,321 filed Nov. 8, 2002 now abandoned, which is a divisional of Ser. No. 09/870,953 filed May 30, 2001, now issued as U.S. Pat. No. 6,499,885.

BACKGROUND OF THE INVENTION

1. Field of the Invention

The present invention relates to a seal ring which is incorporated in, for example, a rolling bearing and relates to a sealing apparatus so-called a pack seal.

The present invention, more particularly, relates to a seal ring into which a rotation detecting sensor is incorporated, a sealing apparatus into which a rotation detecting apparatus composed of the above sensor and a pulsar ring whose rotation is detected by the sensor, and a bearing apparatus having them.

2. Description of the Related Art

Both a magnetic sensor and a pulsar ring provided with N poles and S poles alternatively in a peripheral direction are incorporated as a rotation detecting device into, for example, a bearing apparatus for an axle of an automobile, and they are used for detecting a wheel speed when anti-locking brake control is made.

The present inventors suggest a structure that such a rotation detecting device is integral with a sealing apparatus called as a pack seal.

The seal pack of this suggestion has an outer diameter side seal ring fixed to an inner periphery of an outer ring of a rolling bearing, and an inner diameter side seal ring fixed to an outer periphery of an inner ring.

The magnetic sensor is attached to an inner diameter side of the outer diameter side seal ring. The pulsar ring is attached to an outer diameter side of the inner diameter side seal ring so as to face the magnetic sensor in a radial direction.

In this case, the magnetic sensor is attached to an inner periphery of an annular body of the outer diameter side seal ring by a mold using a resin material. The resin material is formed integrally with or bonded to the annular body of the outer diameter side seal ring so as to become a outer case which covers a periphery of the sensor.

Such a structure is provided because the annular body of the outer diameter side seal ring is press-fitted into an inner peripheral surface of an outer ring or the like so that the outer diameter side seal ring is attached firmly to the outer ring.

However, in the case of the structure that the magnetic sensor is attached to the inner periphery of the annular body of the outer diameter side seal ring by the mold, since a difference in coefficient of linear expansion between the annular body of the outer diameter side seal ring and the outer case is large, after the outer case is formed, it contracts. As a result, a gap is easily generated on a boundary surface between the inner periphery of the annular body of the outer diameter side seal ring and the outer case.

When such a gap is generated, water which splashes on the seal ring from the outside easily penetrates from the gap into the bearing, and this might cause deterioration of the bearing performance such that lubricant inside the bearing is deteriorated.

SUMMARY OF THE INVENTION

Therefore, a main object of the present invention is to provide a seal ring in which a gap is hardly generated on a boundary surface between an annular body of the seal ring and an outer case so that high sealing performance is provided.

Other objects, characteristics and advantages of the present invention will become clear from the following description.

A seal ring according to the present invention is attached to an inner peripheral surface of a fixed outside member, and forms a sealing section on an outer peripheral surface of an inside member to be inserted through the outside member inwardly and rotatably. The seal ring has an annular body with a substantially cylindrical shape, and a sensor member is provided to an outer peripheral side of the annular body, and a resin-made outer case, which is fitted into said outside member in states that the outer case covers the sensor member and has a predetermined interference for the outside member, is provided by insert-forming.

In the case of the present invention, since the outer case formed on the outer periphery of the annular body is formed integrally or bonded to the outer periphery of the annular body in states that its contraction towards an radially inward direction and the outer case press-contacts therewith, a gap is hardly generated on a boundary surface between the annular body and the outer case. Therefore, a seal ring having high sealing performance can be provided.

The invention is preferably constituted so that the sensor member is arranged so as not to contact with the inner peripheral surface of the outside member and so as to substantially contact with the outer peripheral surface of the annular body.

In this case, since resin is interposed between the outside member and the sensor member, even if a gap is generated on a surface between the outside member and the outer case and water penetrates from the gap, the water does not contact with the sensor member. As a result, electrically short-circuit of the sensor member can be prevented securely.

The present invention is preferably constituted so that the sensor member is arranged so as not to substantially contact with the outer peripheral surface of the annular body.

The present invention is preferably constituted so that the sensor member is arranged so as not to substantially contact with the inner peripheral surface of the outside member.

In these cases, since resin is interposed between the annular body and the sensor member, even if a gap is generated on a boundary surface between the outside member and the outer case and water penetrates from the gap, the water does not contact with the sensor member. As a result, electrically short-circuit of the sensor member can be prevented securely.

The present invention is preferably constituted so that an elastic lip, which is brought into contact with the outer peripheral surface of the inside member or a member attached to the outer peripheral surface so as to form a contact sealing section, is provided to the annular body.

In this case, since the contact sealing section is formed by the elastic lip, the sealing performance of the seal ring is heightened.

The present invention is preferably constituted so that a harness for covering signal lines connected with the sensor member is embedded into the outer case.

With this structure, even if a slight gap is generated on a boundary surface between the harness and the resin-made outer case and the water penetrates through the gap, the water does not reach a contact portion between the sensor member and the signal lines.

In the case where the harness is not embedded into the resin-made outer case and only the signal lines are embedded, if a slight gap is generated on a boundary surface between a jacket of the signal lines and the resin-made outer case and the water penetrates from the gap, the water goes along the jacket and conductors of the signal lines and reaches the connected portion of the sensor member and the signal lines. As a result, there possibly arises a defect that the sensor member is electrically shorted-circuited.

On the contrary, it is preferable that the harness is embedded into the outer case because the above-mentioned defect is prevented securely.

BRIEF DESCRIPTION OF THE DRAWINGS

These and other objects as well as advantages of the invention will become clear by the following description of preferred embodiments of the invention with reference to the accompanying drawings, wherein.

In all these figures, like components are indicated by the same numerals.

DETAILED DESCRIPTION OF THE PREFERRED EMBODIMENTS

Figure 1:
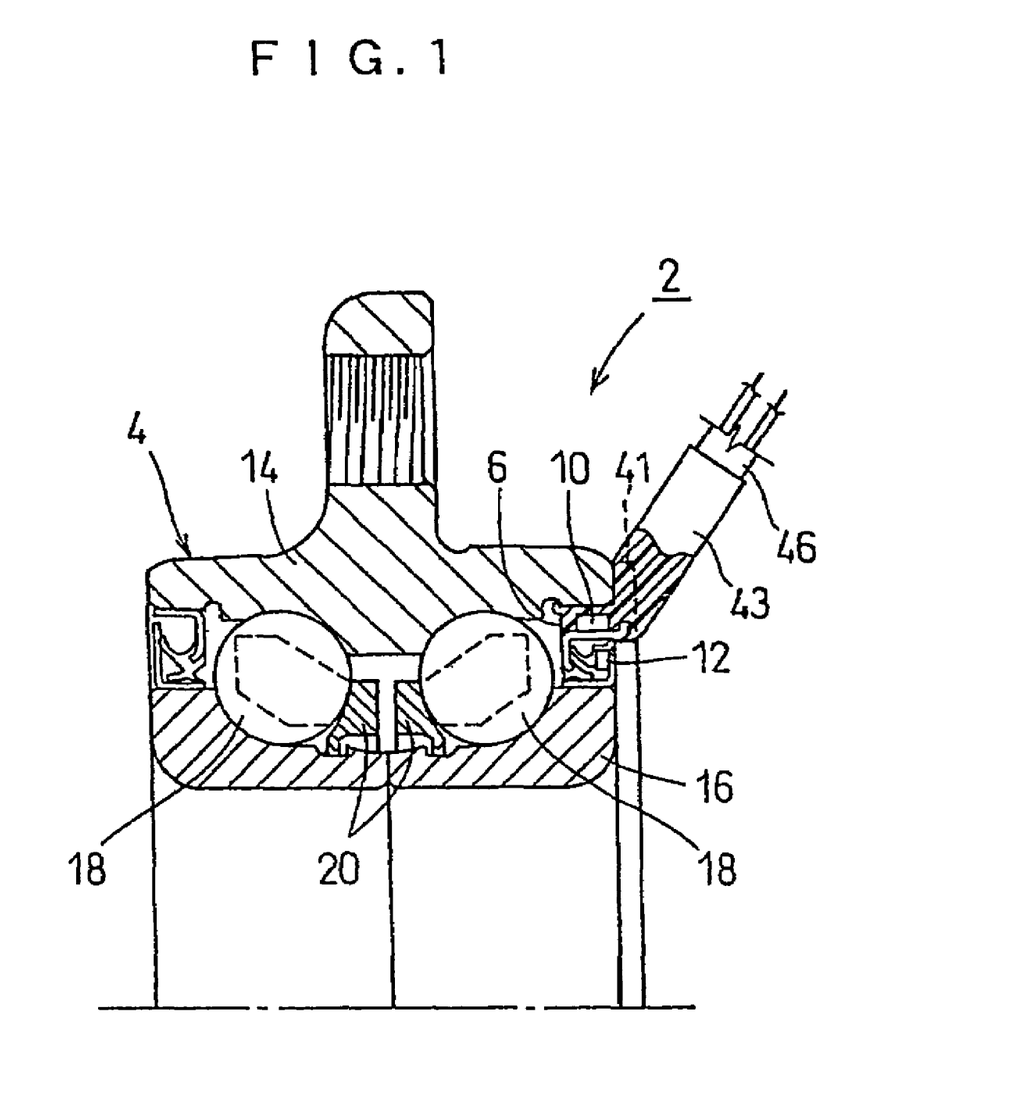
FIG. 1 is a cross sectional view showing an upper half portion of a bearing apparatus provided with a sealing apparatus according to a preferred embodiment of the invention.

At first, there will be explained below a preferred embodiment of the present invention with reference to FIGS. 1 through 3.

A bearing apparatus 2 has a double row rolling bearing 4 and a sealing apparatus 6.

The bearing 4 is provided with a single outer ring 14, two inner rings 16, a plurality of balls 18 and two crown-shaped cages 20.

The outer ring 14 has two rows of raceway sections in an axial direction as an outside member to be fixed.

Both the inner rings 16 are inserted through the outer ring 14 inwardly and rotatably as inside members and arranged so as to be adjacent to each other in an axial direction.

The balls 18 are interposed between the outer ring 14 and the inner rings 16, and the cages 20 holds the balls 18.

The sealing apparatus 6 is constituted so that a first seal ring 22 and a second seal ring 24 are combined.

The first seal ring 22 is attached to a side of the outer ring 14, and a main elastic lip 30 and an auxiliary elastic lip 32 are clad to an annular body 26.

The annular body 26 has a cylindrical section 26a along the axial direction and a disc section 26b which is constituted so that an axially inner end of the cylindrical section 26a is bent to a radial direction inwardly. The annular body 26 is made of preferably metal, but may be made of hard resin.

The second seal ring 24 is attached to a side of the inner ring 16, and an axially elastic lip 38 and a radially elastic lip 40 are clad to an annular body 34.

The annular body 34 has a cylindrical section 34a in an axial direction, and a disc section 34b which is constituted so that an axially outer end of the cylindrical section 34a is bent to a radial direction outwardly. The annular body 34 is made of preferably metal, but may be made of hard resin.

Lubricant 51 is charged between the elastic lips 30 and 32 of the annular body 26 of the first seal ring 22 and the annular body 34 of the second seal ring 24. Lubricant 53 is charged between the first seal ring 22 and the second seal ring 24.

The elastic lips 30, 32, 38 and 40 are composed of rubber materials, such as Acrylonitrile-Butadiene Rubber (NBR), and they are vulcanizing-bonded to the circular bodies 26 and 34.

The annular body 26 of the first seal ring 22 is formed by a non-magnetic material such as JIS SUS304.

A sensor member 10 is incorporated integrally with the first seal ring 22, and a pulsar ring 12 is incorporated integrally with the second seal ring 24.

Here, the sensor member 10 is, for example, a semiconductor circuit, and preferably a magnetic sensor itself such as a hole element, an hole IC and a magnetic resistance element or is a part thereof.

The sensor member 10 is mounted onto an outer peripheral surface of the cylindrical section 26a of the annular body 26 of the first seal ring 22.

An outer case 8 is made of resin, and is bonded to an outer diameter of the cylindrical section 26a of the annular body 26 so as to cover the sensor member 10.

In this case, the outer case 8 is provided by insert forming, and has a thickness for covering the sensor member 10, whereas it is fitted into an inner peripheral surface of the outer ring 14 in a state that it has a predetermined interference.

The sensor member 10 is fixed to an outer peripheral surface of the cylindrical section 26a of the annular body 26 by the outer case 8.

The outer case 8 is made of composite material of engineering plastic, such as polyphenylene sulfide (PPS), polybutylene terephthalate (PBT) and polyamide (PA).

A flange 41 is provided integrally with the outer case 8. The flange 41 locates the sensor member 10 in an axial direction in a state that the first seal ring 22 is attached to the outer ring 14.

The pulsar ring 12 is formed by vulcanizing-molding rubber containing magnetic powder, and is magnetized in a state that N poles and S poles are arranged alternatively in a peripheral direction. The pulsar ring 12 is fixed to a position in an inner direction of the annular body 34 of the second seal ring 24 so as to faces the sensor member 10 in the radial direction In operation, when the inner ring 16 is rotated in a state that the outer ring 14 is fixed into a non-rotation state, the magnetic poles of the pulsar ring 12 rotating with the inner ring 16 are successively opposed to the sensor member 10 fixed to the side of the outer ring 14.

For this reason, since a direction of a magnetic flux which is generated from the pulsar ring 12 to the sensor member 10 changes alternatively, an alternating voltage is output from the sensor member 10.

A waveform cycle of the alternating voltage changes according to a rotation phase and a rotation speed of the pulsar ring 12. When the alternating voltage is processed electrically, a rotation phase, a rotation speed and a number of revolutions of the inner ring 16 are obtained.

In the case of the above-mentioned structure, the sensor member 10 is mounted to the outer peripheral surface of the cylindrical section 26a of the annular body 26 of the first seal ring 22 and is covered by the outer case 8.

For this reason, after the outer case 8 is molded or bonded integrally with the cylindrical section 26a, the outer case 8 is press-contact with the cylindrical section 26a by its contracting function.

As a result, even if expansion coefficients are different between the cylindrical section 26a of the annular body 26 and the outer case 8, a gap is hardly generated on a boundary surface between the cylindrical section 26a and the outer case 8.

Therefore, even if water splashes on the first seal ring 22 from the outside, the water is prevented from penetrating through the inside, and thus deterioration of the lubricant of the bearing 4 is prevented.

The above-mentioned structure is devised in the following manners.

In the case of the first seal ring 22 into which the sensor member 10 is incorporated, the outer case 8 is press-fitted into a shoulder section 14a of the inner peripheral surface of the outer ring 14 so as to be mounted in a tight-fit state.

In the case of the second seal ring 24 into which the pulsar ring 12 is incorporated, the annular body 34 is press-fitted into a shoulder section of the outer peripheral surface of the inner ring 16 so as to be mounted in a tight-fit state.

In this case, as for the second seal ring 24, since the annular body 34 made of metal is press-fitted into the inner ring 16 press-fitted into the inner ring 16, namely, the metal is fitted into the metal, mounting strength of the second seal ring 24 is sufficient so that the second seal ring 24 is located firmly.

On the other hand, as for the first seal ring 22, the outer case 8 is press-fitted into the outer ring 14, namely, the resin is fitted into the metal, mounting strength of the first seal ring 22 easily becomes insufficient.

For this reason, when, for example, the outer case 8 is deformed, there is some fear of displacement of the first seal ring 22 in the axial direction comparatively easily.

After these are taken into consideration, a concave section and a convex section, which are engaged with each other in the axial direction by a snap-fit function, are separately provided to the shoulder section 14a of the inner peripheral surface of the outer ring 14 and the resin-made outer case 8 of the first seal ring 22 so that the first seal ring 22 is hardly displaced from the outer ring 14.

More concretely, a convex section 44 which slantingly projects in a radially outward direction is provided to an inner end of the outer peripheral surface of the outer case 8 of the first seal ring 22 in the axial direction.

Further, in general, when the shoulder section 14a of the inner peripheral surface of the outer ring 14 of the bearing 4 is ground, a whole length of the axial direction of the shoulder section 14a can be ground. For this reason, a groove 42 for relieving a grinding tool is provided continuously in a circumferential direction to an angular section of the shoulder section 14a and a raceway section 14b.

The tool clearance groove 42 is used as the above-mentioned concave section.

With such a structure, when the first seal ring 22 is fitted into the shoulder section 14a of the outer ring 14, at first the convex section 44 is elastically deflected to a radially inward direction so as to reach a position of the tool clearance groove 42. As a result, the convex section 44 recovers elastically so as to be engaged in a snap-fit state.

As a result, the first seal ring 22 is located to the outer ring 14 in the axial direction, and even if the outer case 8 is deformed during use, the first seal ring 22 is not easily displaced to the axial direction.

Furthermore, with such an engagement, when the first seal ring 22 is pinched and pulled to the outward end in the axial direction, the convex section 44 is deflected so as to come out of the tool clearance groove 42.

As a result, the first seal ring 22 is removed comparatively easily, and maintenance of the bearing apparatus and its components is simplified.

Figure 2:
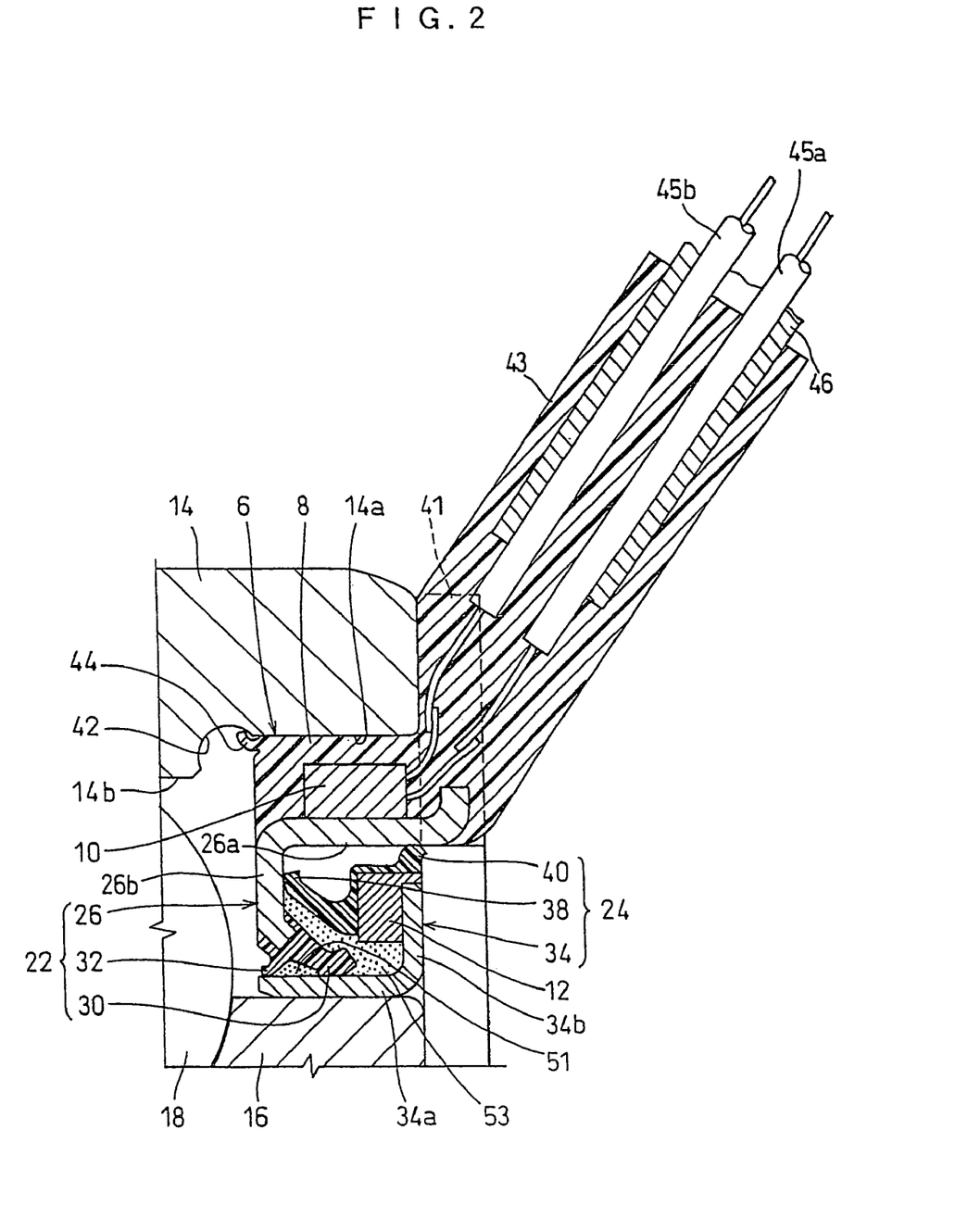
FIG. 2 is a cross sectional view showing one section of an outer ring and an inner ring provided to the bearing apparatus shown in FIG. 1 and an enlarged main sectional view of the sealing apparatus provided between the inner and outer rings.
Figure 3:
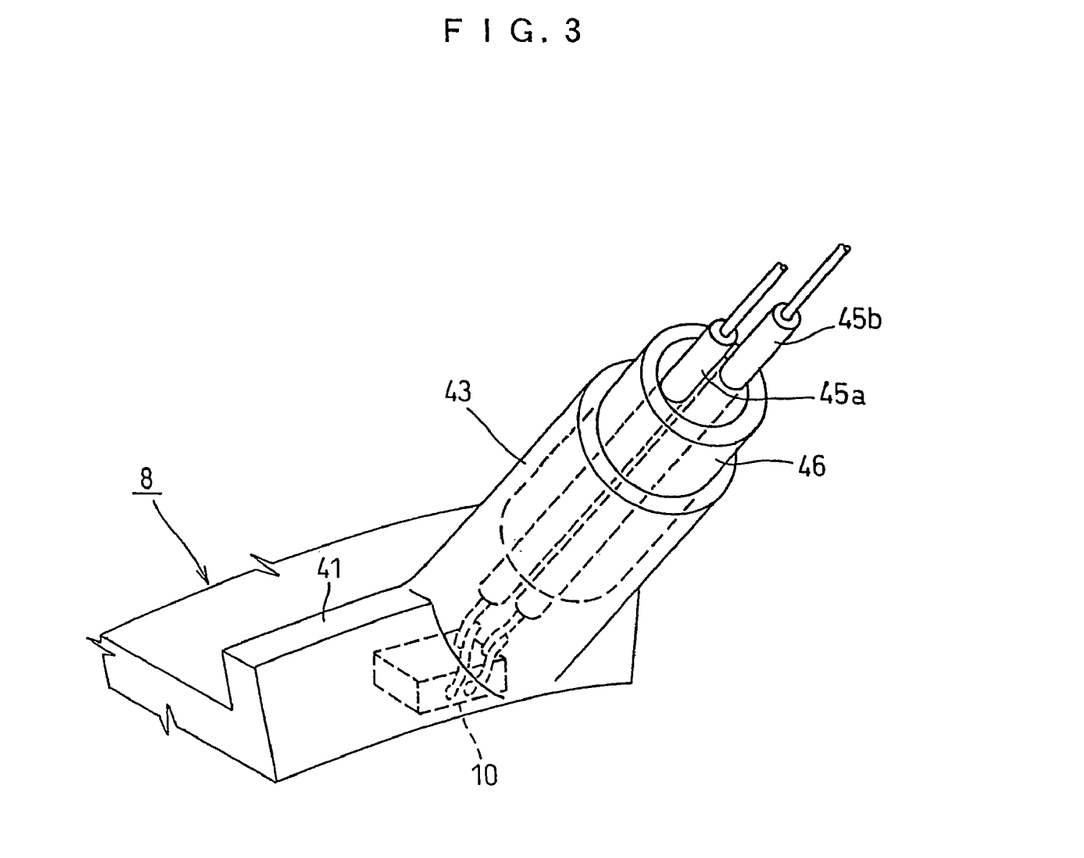
FIG. 3 is a perspective view showing an enlarged appearance of a resin-made outer case integral with a first seal ring provided to the sealing apparatus shown in FIG. 2 and its main section.

Next, as shown in FIGS. 2 and 3, a guiding convex section 43, for drawing out two signal lines 45a and 45b to be connected with the sensor member 10, is provided in a vicinity of the providing position of the sensor member 10 in the outer case 8 so as to slantingly protrude to a radially outward direction.

A harness 46 is embedded into the guiding convex section 43. The harness 46 is composed of an insulating pipe which bundles and sheathes the signal lines 45a and 45b.

In such a manner, even if a slight gap is generated on a boundary surface between the harness 46 and the guiding convex section 43 and water penetrates from the gap, the water does not reach a connected portion between the sensor member 10 and the signal lines 45a and 45b.

In the case where the harness 46 is not embedded but only the signal lines 45a and 45b are embedded into the guiding convex section 43, if a slight gap is generated on the boundary surface between the jacket of the signal lines 45a and 45b and the guiding convex section 43 and water penetrates from the gap, the water goes along the jacket and conductors of the signal lines 45a and 45b and reaches the connected portion of the sensor member 10 and the signal lines 45a and 45b. As a result, there possibly arises a defect that the sensor member 10 is electrically short-circuited.

Figure 4:
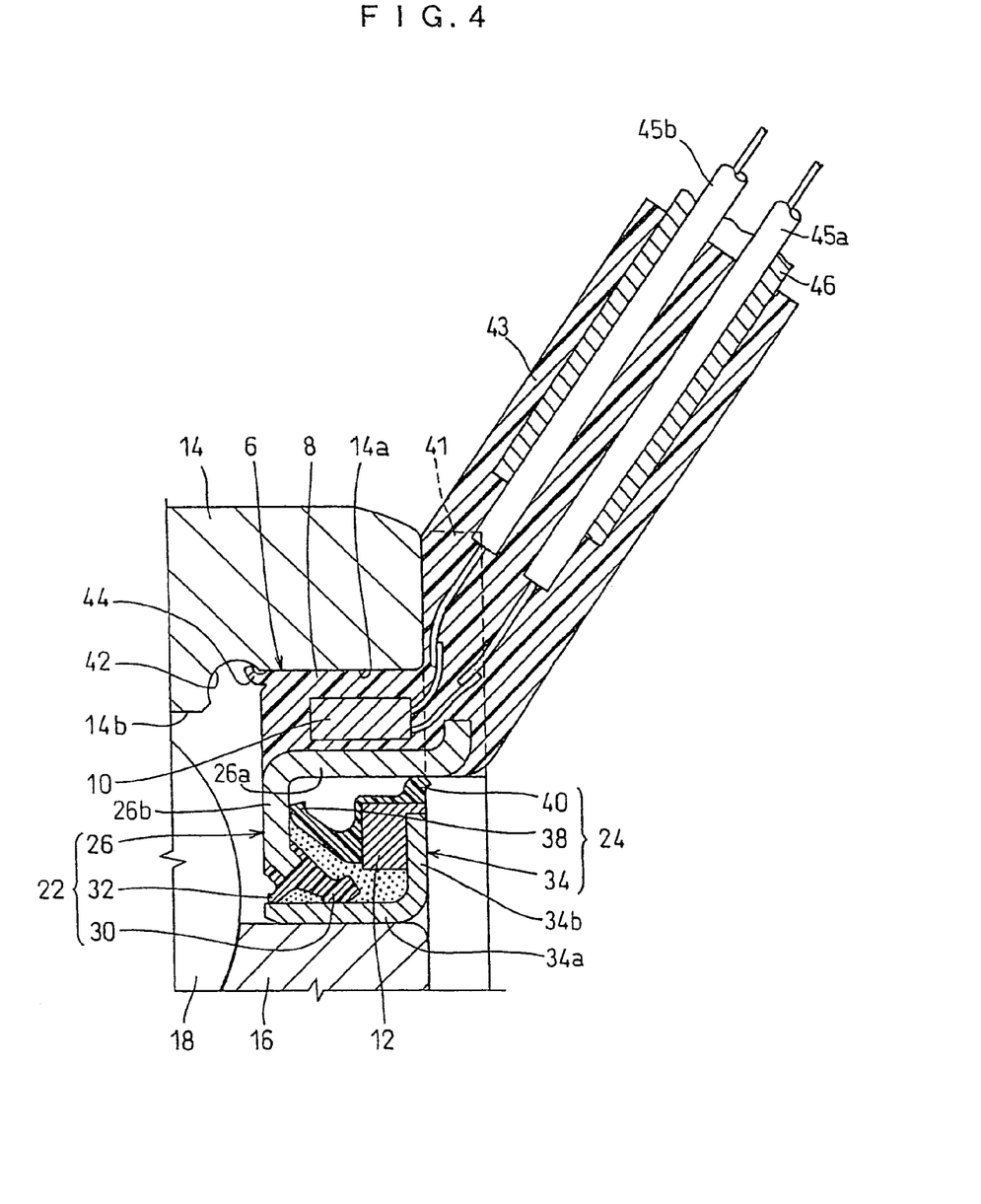
FIG. 4 is an enlarged cross sectional view showing a main section of the sealing apparatus provided with another first seal ring different from the first seal ring shown in FIG. 2.

Further, as shown in FIG. 4, it is preferable that the sensor member 10 is arranged on the outer peripheral surface of the cylindrical section 26a of the annular body 26 of the first seal ring 22 substantially in a non-contact state, and resin is interposed therebetween.

This is because in the case where circularity of the cylindrical section 26a of the annular body 26 is low, a slight gap is easily generated on the boundary surface of the cylindrical section 26a and the outer case 8.

If, in this state, the sensor member 10 is brought into contact with the cylindrical section 26a, when water penetrates from the slight gap, the water reaches the position of the sensor member 10, and there is an undesired possibility of electrical short-circuit of the sensor member 10.

On the contrary, as mentioned above, the resin is interposed between the cylindrical section 26a and the sensor member 10 so that both of them are in non-contact state. In this case, even if a slight gap is generated on the boundary surface between the cylindrical section 26a and the resin-made outer case 8 and water penetrates from the gap, the water does not contact with the sensor member 10. For this reason, the sensor member 10 can be prevented securely from being electrically short-circuited.

As mentioned above, in the case where the resin is interposed between the cylindrical section 26a and the sensor member 10, it is difficult to locate and arrange the sensor member 10 in the radial direction in the outer case 8.

This is solved in such a manner that the annular body 26 and the sensor member 10 are inserted into a forming die in the process for forming the outer case 8, and the sensor member 10 is located and held in a predetermined position of the forming die.

With this manner, even when molten resin is poured into the forming die, the sensor member 10 can be immobilized. For this reason, the sensor member 10 can be incorporated into the resin-made outer case 8 of the first seal ring 22 in a state that the sensor member 10 is located in a radial direction, and thus a relative position between the sensor member 10 of the first seal ring 22 and the pulsar ring 12 of the second seal ring 24 can be managed accurately.

Figure 5:
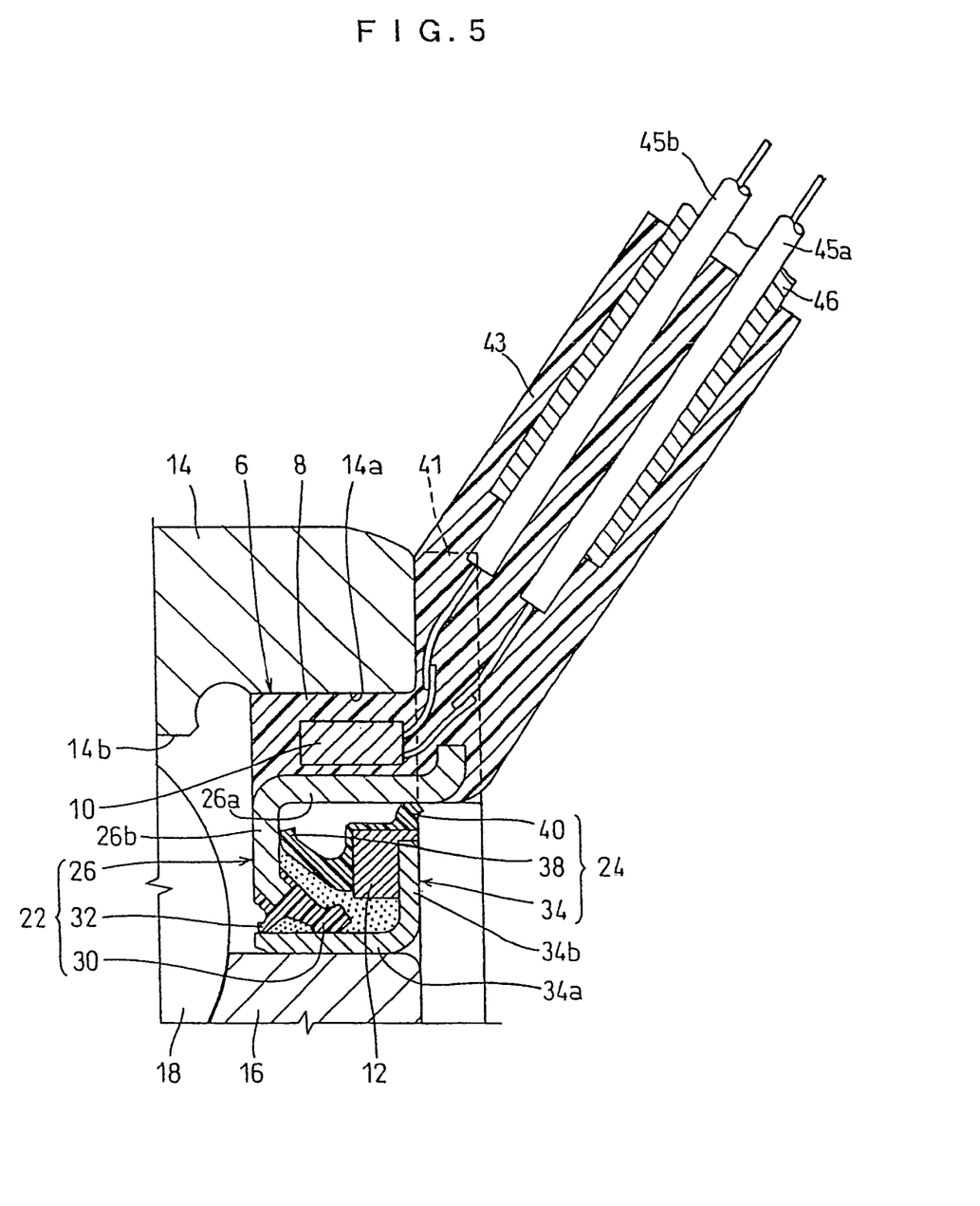
FIG. 5 is an enlarged cross sectional view corresponding to FIG. 2 and showing a main sectional view of the sealing apparatus provided with still another first seal ring different from the first seal ring shown in FIG. 2.

In the above embodiment, the convex section 44 is provided to the outer case 8 of the first seal ring 22, but as shown in FIG. 5, for example, the convex section 44 is not provided to the outer case 8.

In addition, the above embodiment exemplified the bearing apparatus 2 for supporting a wheel as the bearing apparatus, but the bearing apparatus can be used for various other equipment.

In addition, the above embodiment exemplified the structure that the sealing apparatus 6 in which the two seal rings 22 and 24 are combined is mounted to the bearing apparatus 2, but the structure may be such that only the first seal ring 22 is incorporated into the bearing apparatus 2 or rolling bearings having various forms.

Figure 6:
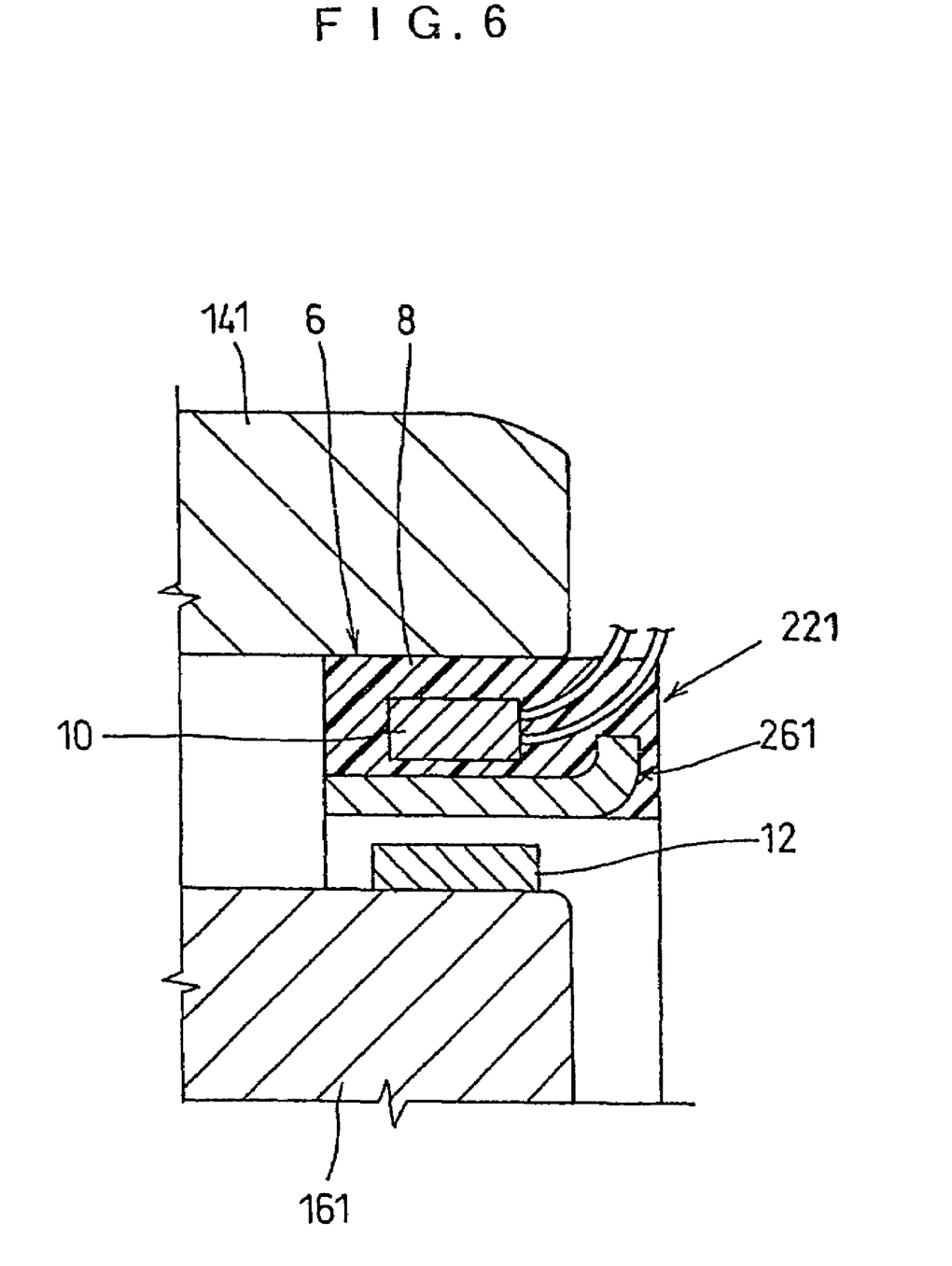
FIG. 6 is a cross sectional view of a main section of a bearing apparatus according to another preferred embodiment of the present invention.

This example is shown in FIG. 6.

In FIG. 6, 141 is an outside member corresponding to the outer ring 14 or the like, and 221 is a seal ring with the sensor member 10 corresponding to the first seal ring 22, and 161 is an inside member corresponding to the inner ring 16.

The seal ring 221 has an annular body 261 with a substantially cylindrical shape, and the sensor member 10 is provided to its outer peripheral surface in a non-contact state, and a resin-made outer case 81 having a thickness for covering the sensor member 10 is provided by insert-forming.

In this case, the pulsar ring 12 which is paired with the sensor member 10 of the seal ring 221 is provided to an outer peripheral surface of the inside member 161.

In addition, in this structure, the cylindrical annular body 261 of the seal ring 221 faces the pulsar ring 12 via a slight gap, and this slight gap forms a non-contact sealing section.

In addition, in the above embodiment, an elastic lip is not provided to the first seal ring 22 and the second seal ring 24, and the seal rings 22 and 24 and their mating members which rotate relatively are allowed to face one another via slight gaps so that the non-contact sealing section may be formed.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A seal ring formed between an outer ring and inner ring rotatable with respect to the outer ring, and comprising a sealing portion formed therebetween, wherein:

the seal ring has a first seal ring attached to the outer ring and a second seal ring attached to the inner ring;

the first seal ring has an annular body having a cylindrical portion extending along the axial direction, and a disk portion in which an axial inner end of the cylindrical portion is bent in the radial inward direction;

a sensor member is provided on the outer periphery of the annular body;

between the first seal ring and second seal ring, a pulsar ring is provided so as to oppose the first seal ring across the annular body of the first seal ring; and the pulsar ring is covered with an elastic lip fitted on the second seal ring.

2. A seal ring according to claim 1, wherein, on the first seal ring, a main elastic lip and supporting elastic lip are provided; on the second seal ring, a radial elastic lip and axial elastic lip are provided; and on the surface of the pulsar ring opposite the cylindrical portion and a surface of the pulsar ring opposite the disk portion, the pulsar ring is covered by the axial direction and axial direction elastic lips.

3. A seal ring according to claim 1, wherein a resin exterior body is provided so as to cover the sensor member, and the exterior body is press inserted in the outer ring.

4. A seal ring according to claim 1, wherein the main elastic lip and supporting elastic lip of the first seal ring directly contact the second seal ring, and a radial elastic lip and axial elastic lip of the second seal ring directly contact the second seal ring.

5. A seal ring according to claim 1, wherein the main elastic lip and supporting elastic lip of the first seal ring directly contact the cylindrical portion of the second seal ring, and the radial elastic lip and axial elastic lip of the second seal ring directly contact the cylindrical portion of the second seal ring.

6. A seal ring according to claim 1, wherein the pulsar ring is sealed from outside by all elastic lips and the first and second seal rings.

7. A seal ring according to claim 1, wherein the entire surface of the sensor is covered with a resin and sealed from the outside by a resin exterior body.

8. A seal ring according to claim 1, wherein the sensor member and first seal ring, integrated by insert molding, are press inserted in the outer ring.

9. A seal ring according to claim 1, wherein the pulsar ring and sensor member oppose each other in the axial direction across the first seal ring.

10. A bearing unit according to claim 1, wherein a harness for covering a signal line connected to the sensor member is embedded in the exterior body.

11. A sealing unit according to claim 1, wherein at least one of the first seal ring and second seal ring comprises an elastic lip alternatingly in contact with the first seal ring and second seal ring so as to form a contact sealing portion.

12. A seal ring according to claim 1, wherein the annular body comprises a cylindrical portion and a disk portion disposed on the axial inner end of the cylindrical portion and bent radially inward, and the sensor member is disposed on the outer periphery of the cylindrical portion of the annular body.

13. A bearing unit according to claim 1, wherein a recess and protrusion of the outer ring axially interlocking by a snap-fit mechanism are provided as separate bodies on a shoulder portion of the outer ring inner periphery and on the exterior body of the first seal ring.

* * * * *